(12) United States Patent
Reed

(10) Patent No.: US 9,156,507 B1
(45) Date of Patent: Oct. 13, 2015

(54) TRUCK BED EXTENDER FOR VARIETY OF MAKES OF VEHICLES

(71) Applicant: Harry F. Reed, Waukee, IA (US)

(72) Inventor: Harry F. Reed, Waukee, IA (US)

(73) Assignee: Circle R Box Extender, Inc., Waukee, IA (US)

( * ) Notice: Subject to any disclaimer, the term of this patent is extended or adjusted under 35 U.S.C. 154(b) by 0 days.

(21) Appl. No.: 14/023,823

(22) Filed: Sep. 11, 2013

(51) Int. Cl.
| | |
|---|---|
| *B62D 33/037* | (2006.01) |
| *B60R 9/06* | (2006.01) |
| *B60P 3/40* | (2006.01) |
| *B62D 33/033* | (2006.01) |

(52) U.S. Cl.
CPC ............... *B62D 33/037* (2013.01); *B60P 3/40* (2013.01); *B60R 9/06* (2013.01); *B62D 33/033* (2013.01)

(58) Field of Classification Search
CPC ............ B60R 9/06; B60P 3/40; B62D 33/033
USPC ......... 296/26.08, 26.11, 26.01, 57.1; 224/402
See application file for complete search history.

(56) References Cited

U.S. PATENT DOCUMENTS

| | | | |
|---|---|---|---|
| 4,778,213 A | 10/1988 | Palmer | |
| 5,947,540 A | 9/1999 | Pariseau et al. | |
| 6,155,622 A | 12/2000 | Reed | |
| 6,513,850 B1 | 2/2003 | Reed | |
| 6,719,345 B2 * | 4/2004 | Ootsuka et al. | 296/26.08 |
| 6,746,066 B2 * | 6/2004 | Reed | 296/26.08 |
| 7,401,833 B2 | 7/2008 | Dryja | |
| 7,484,784 B2 | 2/2009 | Ohly | |
| 8,109,552 B2 | 2/2012 | Nelson | |
| 8,348,331 B2 | 1/2013 | Holt | |

* cited by examiner

*Primary Examiner* — Joseph D Pape
*Assistant Examiner* — Dana Ivey
(74) *Attorney, Agent, or Firm* — McKee, Voorhees & Sease, PLC

(57) ABSTRACT

A truck bed extender which is universally mountable to a plurality of original equipment latching pins and latches for different configured or brand vehicles. Each sidewall is connectable to original equipment tailgate latches on a truck bed body. The mounting interface allows connection for a number of heights relative to truck bed for those original equipment pins. Adjustable simulated mounting pins along lower margins of each sidewall of the bed extender allow for compensation for different placement of original equipment latches on the folded down tailgate. One example is sliders that allow such adjustability. Optionally, stability members of plural configurations are automatically positioned in the gap between tailgate and truck bed body to cooperate with different existing structures on the tailgate of different vehicles to add further stability to the bed extender.

18 Claims, 10 Drawing Sheets

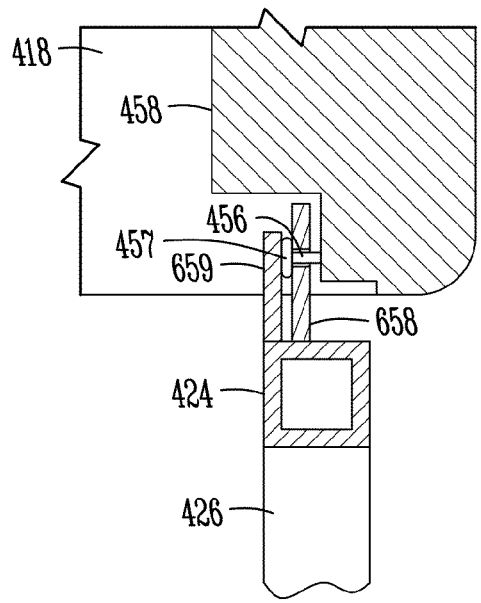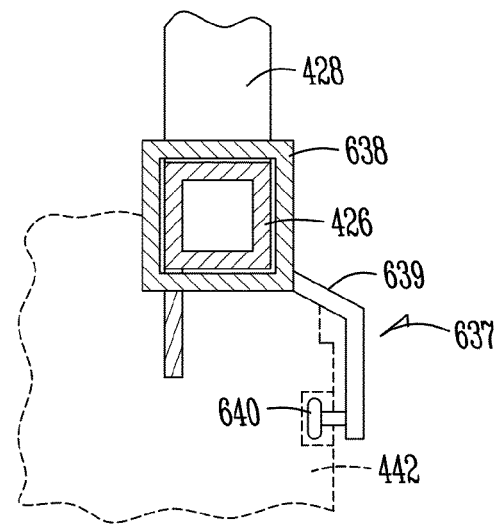
Fig. 6    Fig. 7
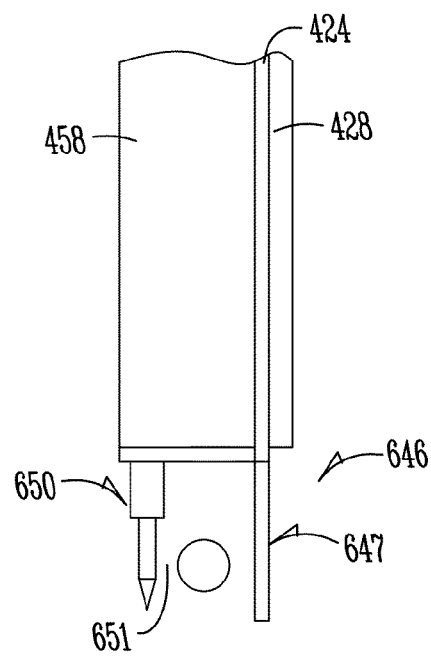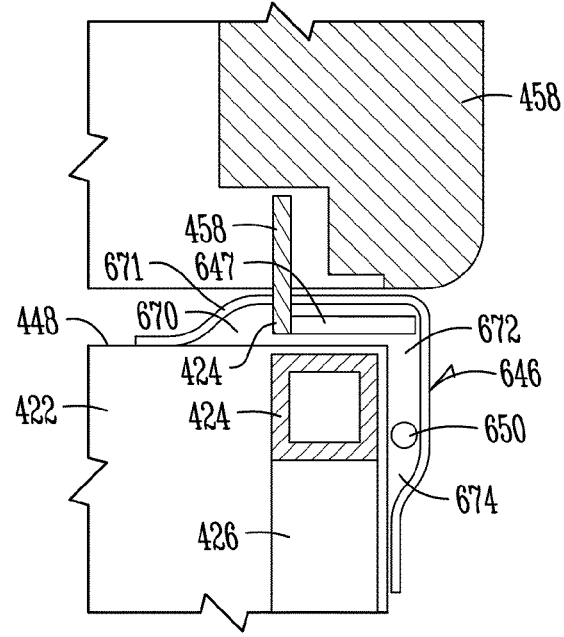
Fig. 8    Fig. 9

TRUCK BED EXTENDER FOR VARIETY OF MAKES OF VEHICLES

BACKGROUND OF THE INVENTION

1. Field of the Invention

The present invention relates to truck bed extenders and, in particular, to a truck bed extender that can fit vehicles of different brands and configurations.

2. Problems in the Art

Truck bed extenders are commercially available from a variety of vendors. Their benefits are well known. They can increase cargo capacity for pickup-style vehicles.

The present inventor has patented several styles of truck bed extenders. They are described at U.S. Pat. Nos. 6,155, 622; 6,513,850; and 6,746,066, each of which is incorporated by reference herein in its entirety. The foregoing patents illustrate truck bed extender features that have a variety of benefits. However, the inventor has identified room for improvement in this technical field.

The foregoing incorporated by reference patents include embodiments that attach to the vehicle using original equipment structure on the vehicle. In particular, U.S. Pat. No. 6,746,066 attaches the front of the truck bed extender to original equipment tailgate latching pins on the pickup truck body. The lower back of the truck bed extender is attached to complementary original equipment latches for those latching pins on the truck tailgate. The truck bed extender is mounted when the tailgate is unlatched and lowered. This makes the original equipment latching pins at the rear sidewalls of the truck bed available as one set of anchoring or mounting points. It also makes the latches on the tailgate available as a second set of anchoring points. Not only does this utilize existing robust mounting locations on the pickup truck, it eliminates costs and complexity of adding aftermarket custom mounting structures to the vehicle, which is required by many other truck bed extenders. Many truck owners would prefer not to modify their vehicles in those ways.

The idea of using existing tailgate latching pins and latches presents an issue that has been identified by the inventor to be of significance. In most vehicles, the original equipment latching pins are in a fixed relationship to the truck body. Latches on the tailgate thus are positioned in geometric correlation. When the tailgate is pivoted around its pivot axis to the closed position, the latches on the tailgate must correspond with the latching pins on the truck body.

However, the fixed position of the tailgate latching pins is not identical across different vehicles. This is particularly true regarding different brand names or manufacturers. The latching pins on one brand might be several inches higher on opposite inside sidewalls of the truck body than on another brand. This makes the latches on the tailgate several inches farther out on the tailgate.

The state of the art accounts for the different fixed relationships between latching pins and latches between different pickup trucks by building a different bed extender configuration for each different latching pin/latch configuration. For example, General Motors pickup trucks would require a bed extender such as U.S. Pat. No. 6,746,066 with different latch pin/latch mount locations than one for Ford pickups. And Ram pickups would require a still further model bed extender. Still further models might require different bed extender mounts and thus require still further inventory. This adds cost and complexity to the manufacturing process. This requires an inventory of different bed extender models for different brand pickups, which can also increase cost to dealers and distributors.

Thus, the state of the art generally builds a different model bed extender for different configuration vehicles. A solution to this issue is nontrivial. Economy is a factor with truck bed extenders. These aftermarket products must be economically attractive and practical to consumers. Additionally, the complexity, material costs, flexibility and ease of use, and structural robustness are all competing factors that must be accounted for.

SUMMARY OF THE INVENTION

It is therefore a principal object, feature, aspect, or advantage of the present invention to provide a truck bed extender system to solve deficiencies in or problems associated with the state of the art.

Further objects, features, aspects, or advantages of the present invention relate to an apparatus, system, or method as above described which:

a. is universally mountable to a variety of different configured or brand vehicles;
b. is economical;
c. is non-complex in the structure and operation;
d. is structurally robust;
e. is easy to install and use, can have flexibility of disassembly into pieces that can be more easily stored, and includes other beneficial features.

These and other objects, features, aspects, or advantages of the present invention will become more apparent with reference to the accompanying specification and claims.

In one aspect of the invention, a truck bed extender is mountable to the rear of any of a plurality of pickup or similar truck bodies with lowerable tailgates regardless of spacing of tailgate latching pins and tailgate latches on the tailgate. Left and right vertical bed extender sides each have lower edges that are positionable at or on the lowered tailgate. Front edges of those sides are positionable at or near the existing tailgate latching pins on the truck body. Pin receivers at or near the front edges of the left and right extender sides receive the existing tailgate latching pins over a range of different distances from the pivot axis for the tailgate. That range of distances allows different heights of latching pins for different configurations or brands of pickups. Additionally, what will be called simulated tailgate latching pins are mounted along the bottom edges of the left and right bed extender sides. These simulated latching pins are, however, adjustable along those lower bed extender sides. In one embodiment they are slideable along the bed extender bottom sides. This allows them to be adjusted into alignment with existing latches on the tailgate for a variety of types of vehicles. These simulated pins simulate the shape and configuration of the original equipment latching pins. This allows them to be captured and held by the original equipment latches on the tailgate. Thus, the front of the truck bed extender is held at the original equipment latching pins on the truck bed body. The lower back of the truck bed extender is held in the tailgate latches. These robust attachment points resist movement of the truck bed extender in most directions and provide robust anchoring of the bed extender to the vehicle.

In another aspect of the invention, the pin receivers at the front of the sides of the truck bed extender can be plural sets of keyhole-shaped slots. The sets of slots can be at different heights from the truck bed to match different latching pin heights for different truck models or brands.

In another aspect of the invention, the simulated tailgate latching pins are adjustable on sliding sleeves along the lower edge of the truck bed extender sides. This allows positioning of those simulated pins for different locations of existing latches on the tailgate. As such, utilization of the original equipment tailgate latching pins and latches are a robust and economical way to attach the truck bed extender. Yet, adjustability of the bed extender attachment points accommodate different configured vehicles or brands. This allows economy in manufacturing and assembly of the truck bed extender. One model or configuration of the bed extender fits a variety of vehicle models, configurations, or brands.

In another aspect of the invention, an optional stabilizer spacer can be incorporated into the lower front of the bed extender. The spacer is mounted in a position and configured to fit into either the gap between tailgate and truck bed or into or over some existing structure at or around the tailgate hinge or pivot axis. It provides a third mounting point for the bed extender. It can help stabilize the bed extender relative to the truck. It can help the lower front of the bed extender remain in position even if forces attempting to move it horizontally are experienced. In one embodiment of this feature, the stability spacer could be placed at least at one front and lower corner of the bed extender. In another embodiment, a stability spacer could be placed at opposite front and lower corners of the bed extender. Each stability spacer can have plural downwardly extending portions. Each portion would be specifically configured for a different configuration, model, or brand of vehicle. For example, the stability spacer could have first and second downwardly extending fingers or arms. The first finger or arm could work for at least a first brand or configuration of vehicle. The second finger or arm could work for a different configuration or brand. This is another way of universal mounting of the bed extender to a variety of vehicle configurations or brands.

BRIEF DESCRIPTION OF THE DRAWINGS

FIGS. 3A and B also shown in dashed lines how different brands or models of pickups can have different bed sidewall and latching pin heights, which would also change the height and position of latches on the tailgate.

FIG. 4 is annotated with dimensions giving an indication of extended bed capacity for all three types of pick up.

FIG. 5B also shows how this embodiment of the invention can be adjusted to match the different position of the tailgate latches because of the taller truck bed mounting pins.

FIG. 6 is an enlarged sectional view taken along line 6-6 of FIG. 5A.

FIG. 7 is an enlarged sectional view taken along line 7-7 of FIG. 5A.

FIG. 8 is an enlarged sectional view taken along line 8-8 of FIG. 2B.

FIG. 9 is an enlarged sectional view taken along line 9-9 of FIG. 5A.

DETAILED DESCRIPTION OF EXEMPLARY EMBODIMENTS

Overview

Figure 1:
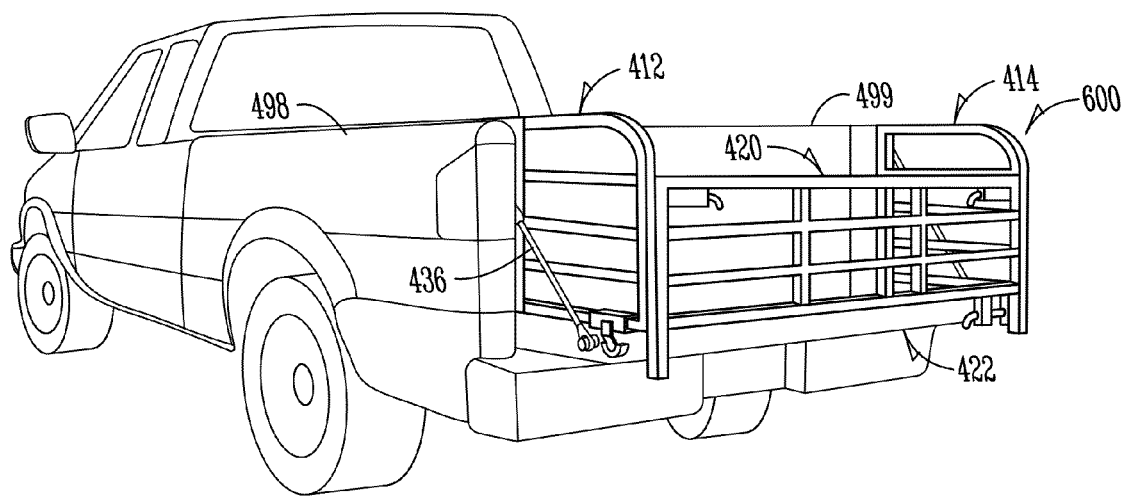
FIG. 1 is a rear perspective view of a pickup truck with a bed expander or extension of the type of the inventor's U.S. Pat. No. 6,746,066 in installed position but modified according to one exemplary embodiment of the present invention.

For a better understanding of the invention, one example of a form the invention can take will now be described in specific detail. Frequent reference will be taken to the appended drawings. Reference numbers and letters will be used to indicate certain parts or locations in the drawings. The same reference numerals or letters will be used to indicate the same parts or locations throughout the drawings unless otherwise indicated.

Figure 3A:
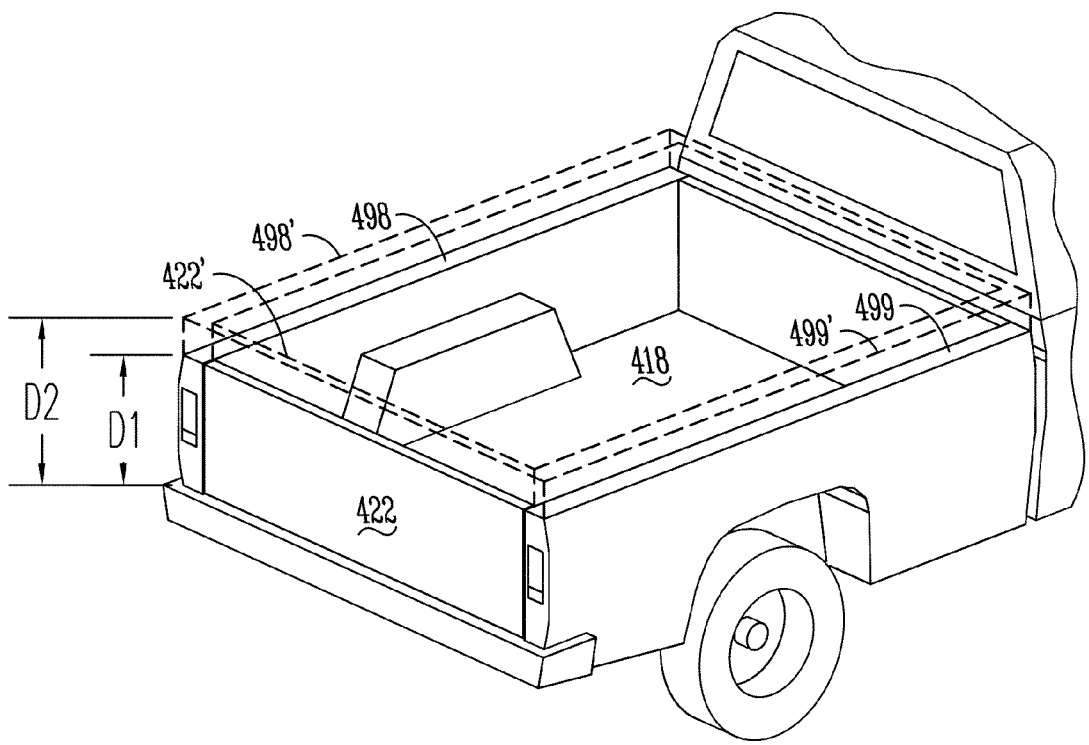
FIGS. 3A and B are diagrammatical views of a conventional pickup with tailgate in up or latched position (FIG. 3A) and pivoted down (FIG. 3B) showing the geometrical relationship of original equipment latching pins on the truck bed sidewalls and original equipment pin latches on the tailgate.
Figure 3B:
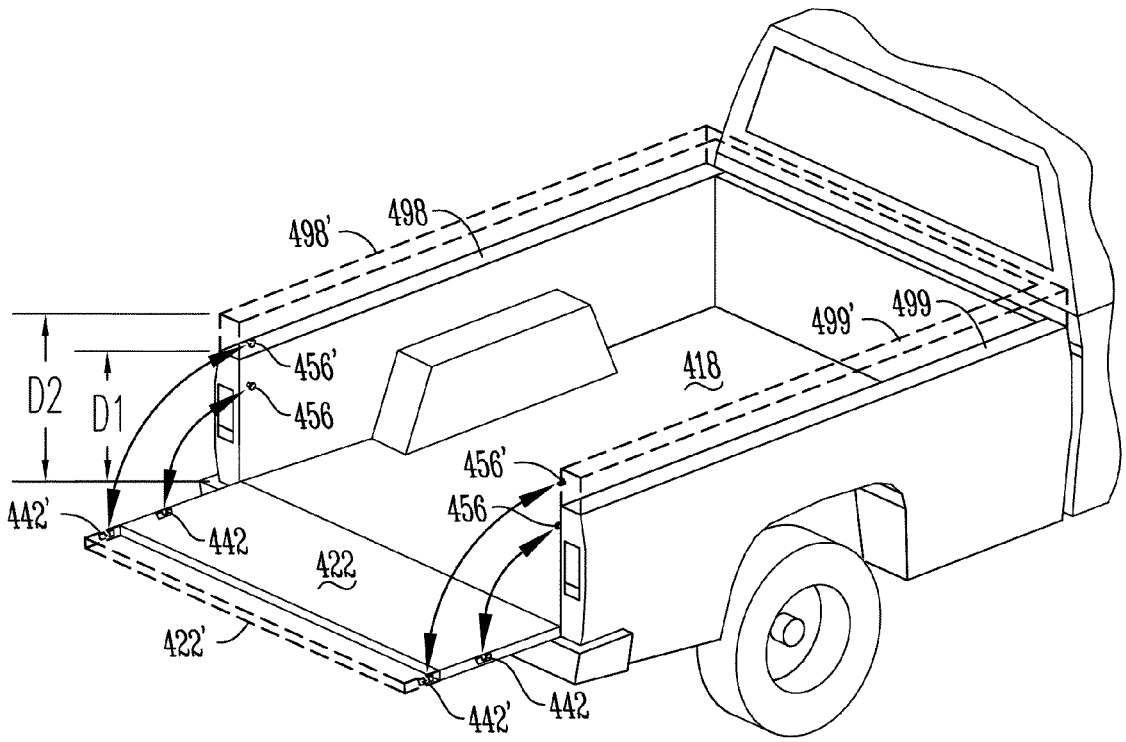

As indicated earlier, various brands of pickup trucks (e.g. Ford, Chevrolet/GMC, Dodge Ram), have different height original equipment latching pins relative to the tailgate pivot axis. As indicated at FIGS. 3A and 3B, these different latching pin heights mean that one configuration of truck bed extender 400 from U.S. Pat. No. 6,746,066 would fit on one set of latch pins but not the other. Therefore, separate models of each bed extender would have to be built for different brand pickups. This complicates manufacturing and inventory control.

FIGS. 3A and 3B illustrate this issue. Different model pickups have different truck bed configurations. One configuration of truck (solid lines) has original equipment latching pins 456 (one on each side of the truck bed aligned along a horizontal axis) at a distance or height D1 relative tailgate pivot axis (or plane of truck bed 418). Height D1 for latching pins 456 informs the distance from the tailgate pivot axis to latches 442 on tailgate 422. That distance must be essentially the same so that latches 442 on the tailgate latch to pins 456 on the truck bed side walls when tailgate 422 is pivoted up to vertical closed position (FIG. 3A, solid lines). On the other hand, when tailgate 418 is unlatched and pivoted down to horizontal (FIG. 3B), the original equipment latching pins 456 and the tailgate latches 442 are exposed and not used. The invention of U.S. Pat. No. 6,746,066 takes advantage of these exposed, unused components when the tailgate is down as mounting points for a bed extender.

The present invention addresses the issue indicated in dashed lines in FIG. 3B. For pickups with higher bed sidewalls and/or higher original equipment latching pins 456' (i.e. at distance D2 greater than D1 from the tailgate pivot axis), the tailgate latches 442' must be farther away along the sides of tailgate 418 a corresponding distance. Thus, a bed extender like that of U.S. Pat. No. 6,746,066 that mounts to pins 456 and latches 442 (solid lines in FIG. 3B) would not fit to pins 456' and latches 442' (dashed lines in FIG. 3B). It is to be understood that just two different distances D1 and D2 are shown diagrammatically in the drawings. The difference in distances can vary. Additionally, the invention is applicable to more than two distances, as will be appreciated by those skilled in this technical field.

Figure 4:
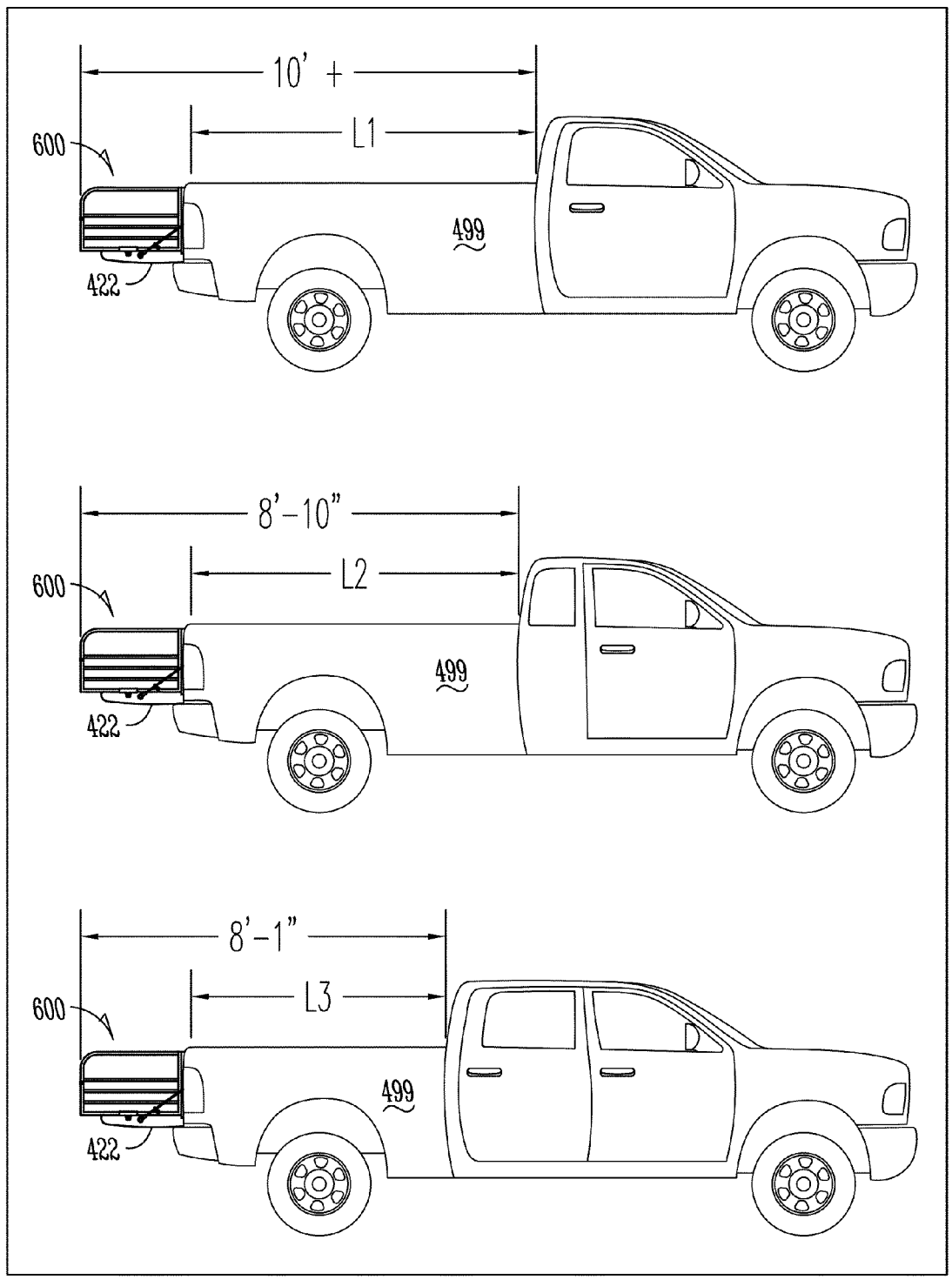
FIG. 4 is diagrammatic views of the truck bed extender of FIG. 1 installed on pickups of different styles of cab, namely two door without extended cab (top), two door with extended cab (middle), and four door extended cab (bottom).

FIG. 4 illustrates another variable regarding pickup trucks. Whether in the same brand of vehicles or across brands, present day pickups include a variety of cab and bed configurations. One example is a two door conventional cab (top diagram in FIG. 4). Another is a two door extended cab (middle diagram). A third is a four door extended cab (bottom diagram). While different bed lengths are possible, in most conventional brand lines, unless specially ordered, the overall vehicle length is basically the same. As indicated in FIG. 4, the more extended the cab, the less vehicle truck bed cargo space is available. While it is to be appreciated that certain dimensions of the bed extender of the present invention can be scaled up or down, one example of its size is generally indicated in FIG. 4. The width of bed extender 600 is dictated primarily by conventional widths of main brands of pickup trucks. Its length can be any of a variety of lengths. It will be appreciated that these dimensions can vary according to design or need. But as indicated in FIG. 4, bed extender 600 can extend the effective length of the truck bed of the standard two door pickup (top model in FIG. 4) from approximately 8 feet to over 10 feet. It could extend the shorter bed of the two door extended cab (middle drawing of FIG. 4) to approximately 8 feet 10½ inches. This retains enough bed length to carry a conventional 8×4 foot sheet of construction material. But even the four door extended cab (bottom drawing in FIG. 4) would be extended approximately to 8 feet 1 inch; again meeting that minimum 8×4 foot construction material carrying capacity. As an example, a Dodge Ram four door cab can have bed lengths as short as approximately 5 feet, 7½ inches. The present bed extender 600 could extend the carrying capacity out to over 8 feet. It is to be appreciated, however, the bed extender 600 could be made in various lengths by extending or shortening the length of the side walls 412 and 414. As can be appreciated, any of the body styles in FIG. 4 could have different height original equipment latching pins (as illustrated in FIGS. 3A and 3B).

The exemplary embodiments of the invention will be discussed in the context of the foregoing. It will also be discussed in the context of main brand commercially-available pickup trucks. As can be appreciated, however, it could be also potentially used with analogous vehicles that have a hinged tailgate and original equipment latching pins and latches of this type.

Apparatus

FIG. 1 illustrates generally truck bed expander/extension 600 according to one exemplary embodiment of the invention. It is to be understood that many of the structural features of bed extender 600 are similar or the same to those of bed extender 400 in incorporated by reference U.S. Pat. No. 6,746,066. Reference can be taken to that patent for such details which will not be repeated here.

For example, as in U.S. Pat. No. 6,746,066, bed extender 600 can be made of three primary pieces of tubular metal. Left and right sides 412 and 414 mount generally parallel to the left and right truck bed side walls 498 and 499 (see FIG. 1). A rear cross member or gate 420 can be releasably attached to the rear vertical edges or sides of side members 412 and 414. Details are described in U.S. Pat. No. 6,746,066. Rear gate 420 can hinge down to provide unobstructed access across tailgate 422 and into truck bed 418. Details can be seen at U.S. Pat. No. 6,746,066.

The main differences between bed extender 400 of U.S. Pat. No. 6,746,066 and present exemplary embodiment 600 are as follows.

Double Front Latch Pin Receiving Slots for Truck Bed Latching Pins

Figure 2A:
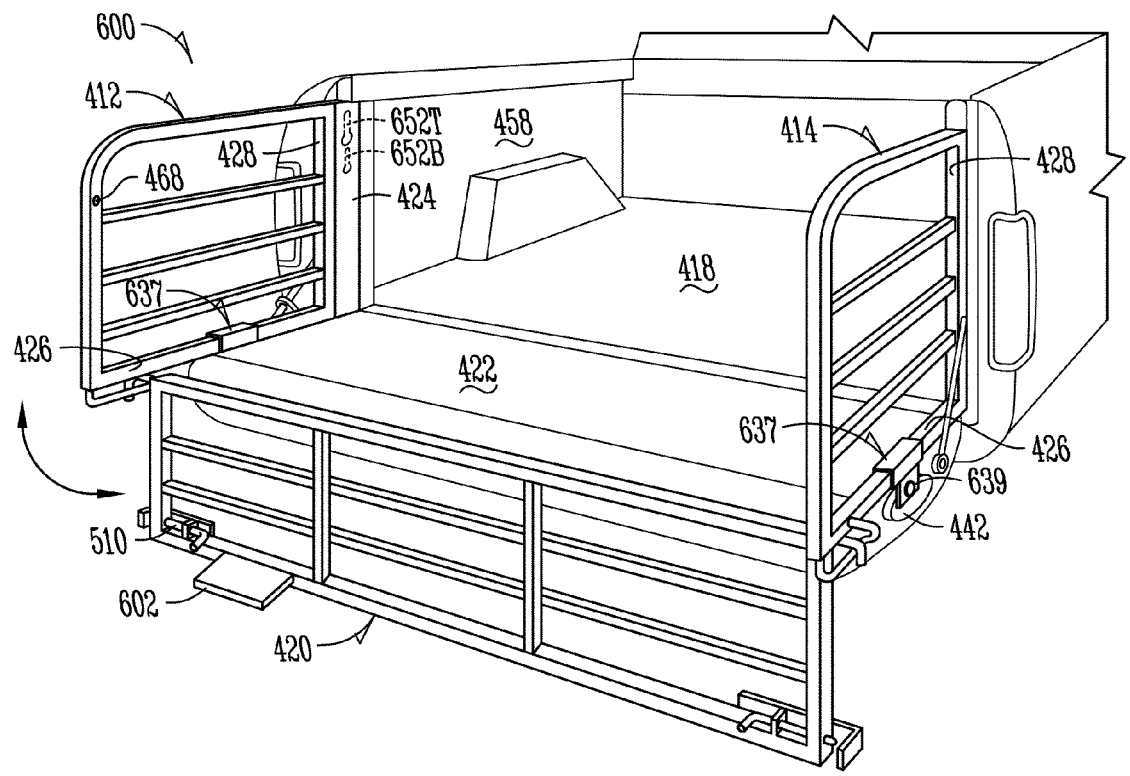
FIG. 2A is a slightly enlarged partial perspective of the rear of the vehicle of FIG. 1 and the modified bed extender in installed position from a different view point but showing how the rear gate can be optionally pivoted down for loading or unloading.
Figure 2B:
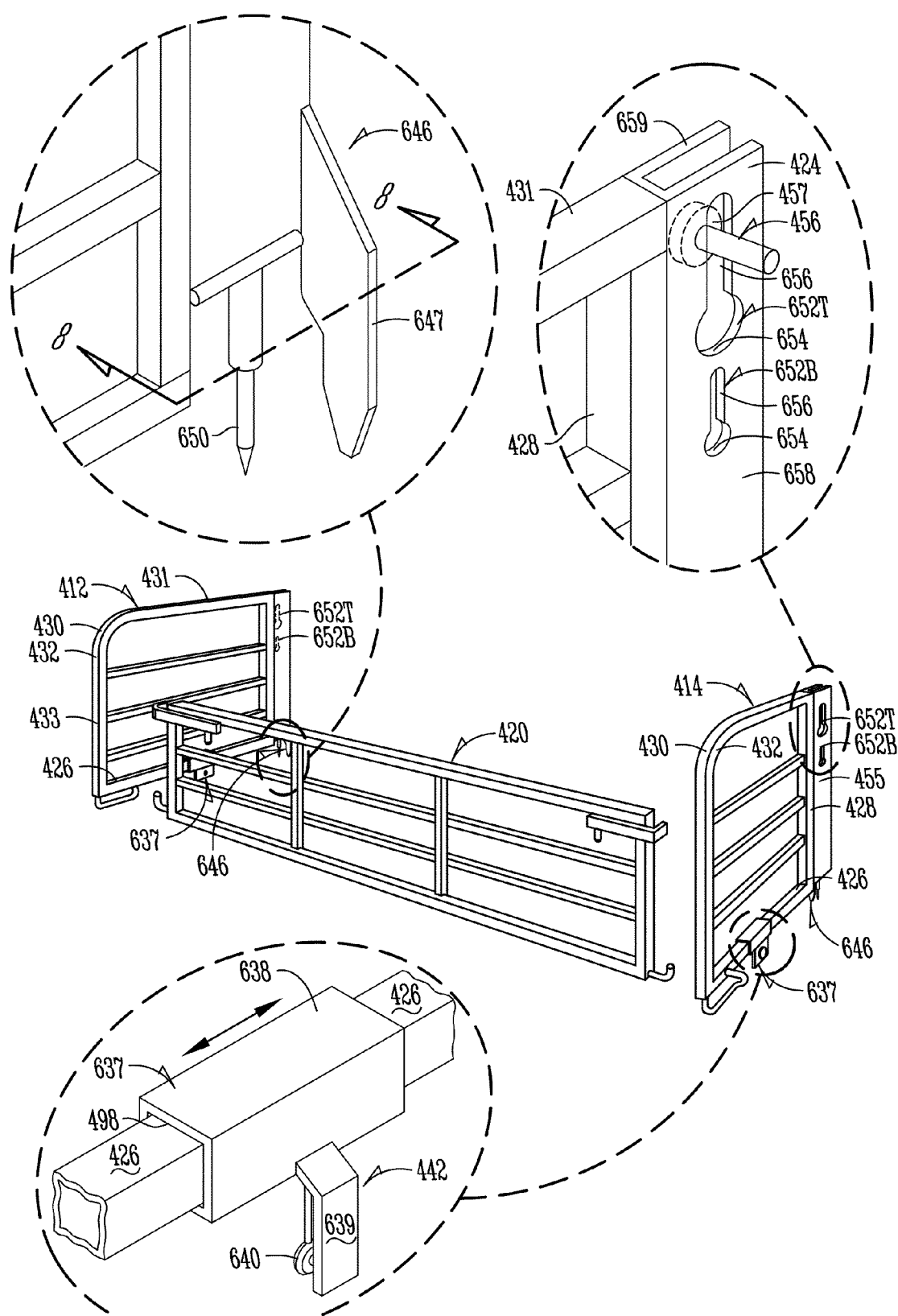
FIG. 2B is an isolated perspective exploded view of the main pieces of the modified bed extender of FIGS. 1 and 2A and also including enlarged isolated views of principle components according to the invention which modify the version of U.S. Pat. No. 6,746,066.

First, referring to FIGS. 2A and 2B (and the enlarged isolated views of associated with FIG. 2B), instead of a single latching pin receiving slot 452 (see FIGS. 16 and 17 of U.S. Pat. No. 6,746,066) at each side 412 of bed extender 400, two such key-hole shaped slots 652T (for "top") and 652B (for "bottom") are aligned along a metal plate or flange 424 along each front edge pillar 428 for each side 412 and 414. Enlargement 13-13 in FIG. 2B shows this two slot arrangement. This two-slot arrangement could alternatively be built in along the side of pillar 428. This allows attachment of the front upper sides of each extender side 412 and 414 to original equipment latching pins 456 at two different heights or distances from the tailgate 422 pivot axis or level of truck bed 418.

Figure 5A:
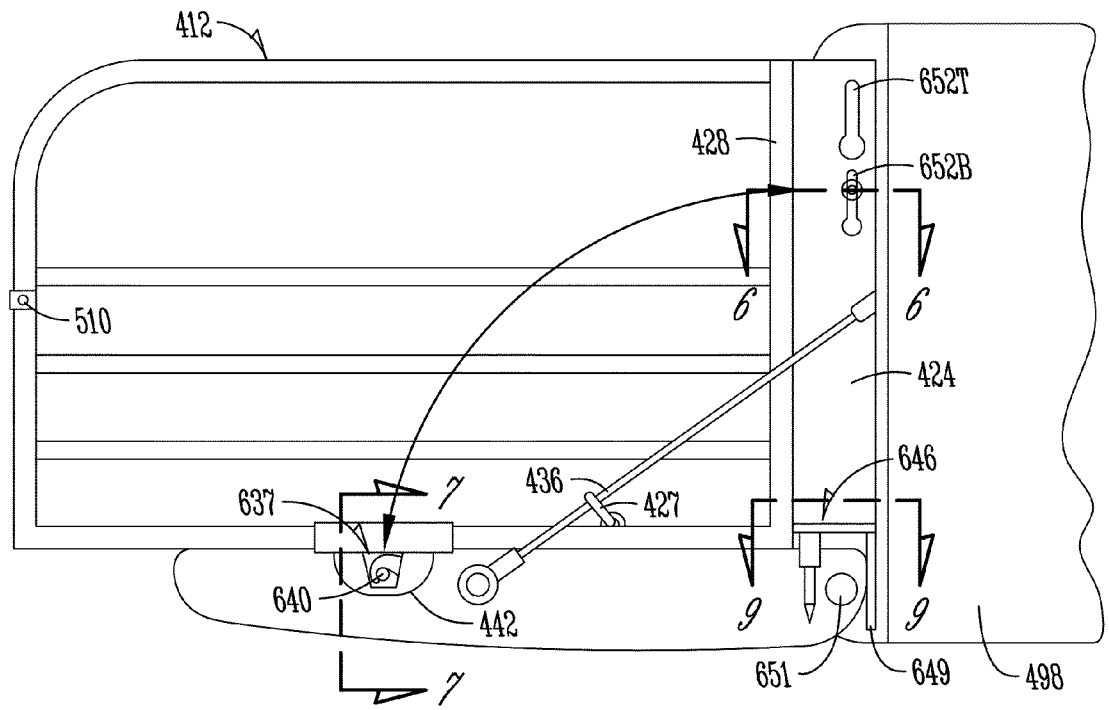
FIG. 5A is an enlarged isolated side elevation of the left-hand side of the bed extender of FIG. 1 mounted on a pickup of a first brand or model, where the truck bed mounting pins are at a first height from the truck bed.
Figure 5B:
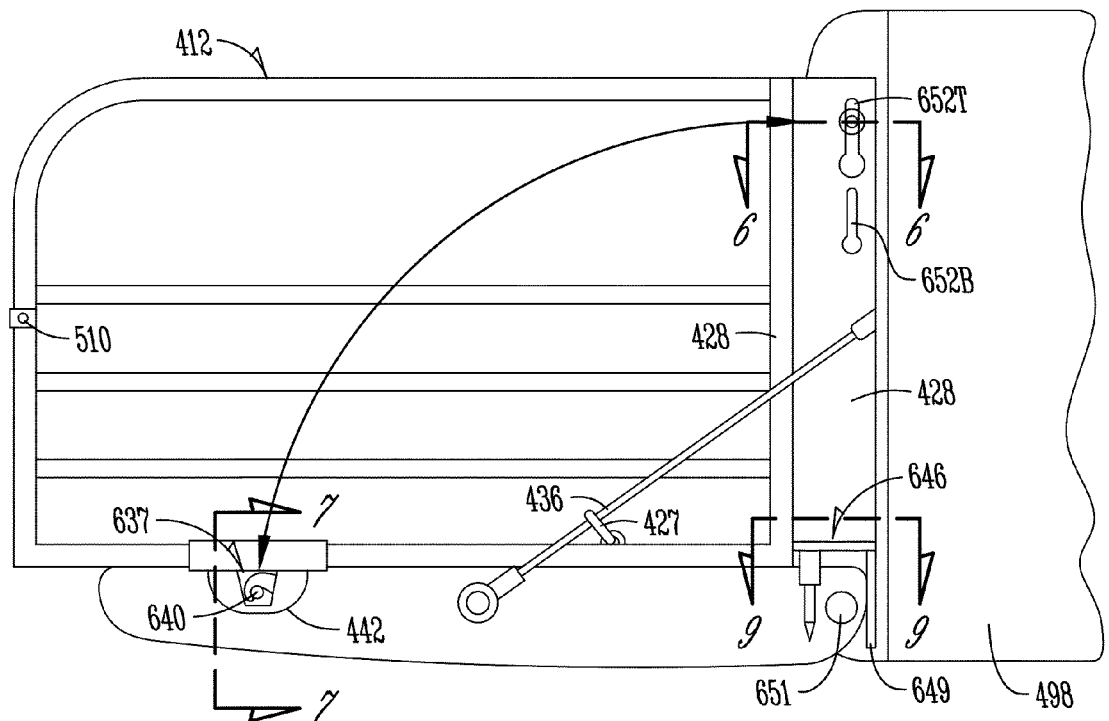
FIG. 5B is similar to FIG. 5A but shows the one side of the bed extender of FIG. 1 mounted to a pickup of a second model or brand, where the truck bed mounting pins are a second height from the truck bed which is greater than in FIG. 5A.
Figure 10:
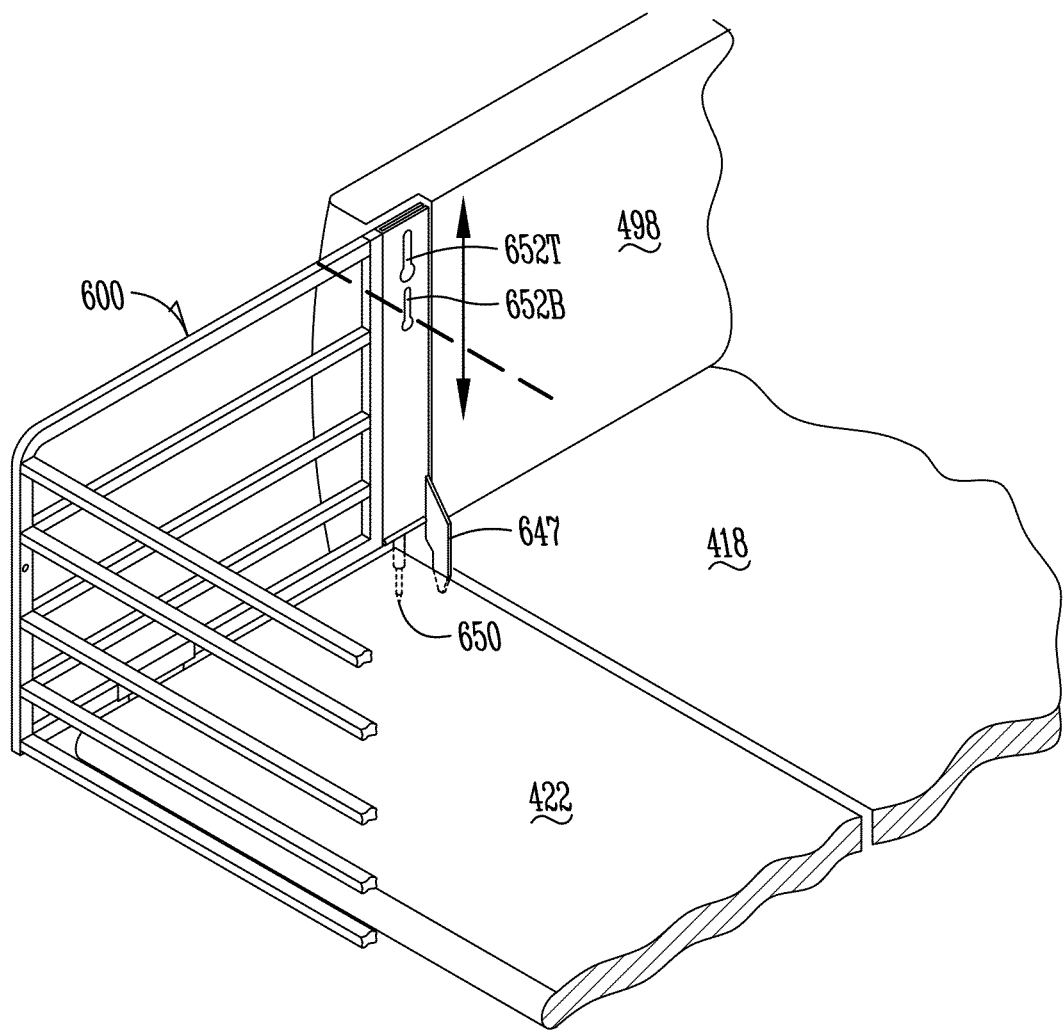
FIG. 10 is a partial perspective view of one side of the installed bed extender of FIG. 1 showing in more detail operation of the spacer stabilizer feature of FIG. 9.

Importantly, while two slots 652T and 652B are shown on each side, they are each elongated. Therefore, this system can mount to original equipment latching pins over an almost infinite variety of heights from truck bed 418 over a range from the lowermost point of the lowermost slot 652B to the top of the uppermost slot 652T. As indicated in FIG. 13, for example, the stem attached to the head 457 of the original equipment latching pin 456 only needs to be captured somewhere along the narrower portion 656 of one of the key hole shaped slots 652T or 652B above the larger receiving hole 654. It does not need to abut either opposite end of a keyhole shaped slot 652T or 652B. Captured in the narrower portion of the keyhole shaped slot, the original equipment latching pin would hold that front and side of the bed extender 600 against fore and aft or lateral movement relative the truck bed. Although it would allow some vertical movement between the opposite ends of the keyhole shaped slot, the weight of side 412 or 414 would urge it downward by gravity towards tailgate 422. By mounting both sides 412 and 414 into corresponding slots 652T or 652B, both sides of the whole bed extender 600 would be held in place except for a limited vertical range of possible movement (defined by the length of the slot 652 in which the latching pin 456 is mounted). This allows for relatively easy attachment of the front of bed extender 600 to the original equipment latching pins of the inside walls 458 of the truck bed, but substantially complete resistance to movement of bed extender 600 except as noted. The dual sets of key hole shaped mounted slots 656T and 656B give more mounting choices for extender 600. A parallel metal flange or wall 659 can hold pin 456 from much lateral movement (see FIG. 2B, enlarged view at upper right side). The area 455 below slots 652T and 652B of plate 424 can extend along pillar 426. See also FIG. 6 (taken along line 6-6 of FIG. 5A) regarding how latching pin 456 is captured in a slot 652T or 652B.

In the exemplary embodiment, key slots 652T and 652B are of different sizes. In particular, slots 652T have a larger diameter bottom pin entry hole 654 than slot 656 and a wider and longer vertical slot 656. Conversely, key slot 652B has a smaller entry opening 654 and a narrower and shorter vertical slot 656. This is to accommodate Ford and GMC/Chevy pickups that tend to have latching pins 456 higher and slightly bigger heads and stems than Dodge latching pins. As can be appreciated, however, some tolerance can be built into the slots and still function effectively. Furthermore, it is to be understood that the slots can be made of different configurations to facilitate different latching pins (height, head diameter and stem diameter) that might exist in either future truck models or in truck models beyond GMC/Chevy, Ford, and Dodge Ram.

Parallel flanges 424 and 659 (flange 424 has the double key hole slots 652T and 652B) can be welded to the front face of vertical pillar 428. Flange 659 shields the view of key slots and latching pins from view when bed extender 600 is installed.

Sliding Lower Pin Assemblies for Tailgate Latches

Second, also shown at FIGS. 2A and 2B are slider pin assemblies 637 mounted along lower rail 426 of each side 412 and 414 of bed extender 600. Each assembly 637 essentially is a tubular sleeve 638 (see lower enlarged view in FIG. 2B) that is configured to have a hollow interior that relatively closely conforms with the exterior of rail 426 but relatively easily slides along it. Each sleeve 638 has an angled arm 639 that extends down and away from the lateral side of rail 426. A simulated pin 640 extends medially from angled arm 639. By simulation it is meant they basically are the same configuration and shape as the existing latching pins 456 on the bed of the truck. Therefore, when appropriately aligned with original equipment latches 442 on tailgate 422, simulated pins 640 may be inserted into latches 442 and those original equipment latches will capture them and prevent movement in virtually any direction until released from latches 442 (e.g. by manual pulling of the original equipment tailgate release handle—which is more conventionally used to unlatch the tailgate from the original equipment latching pins). Therefore, whether the front of bed extender 600 is attached to top key hole shaped slots 656T or the bottom ones 656B, the bottom and back of bed extender 600 can be latched to original equipment tailgate latches 442 (on the opposite sides of tailgate 422) by simply sliding members 637 so that simulated pins 640 on them are in alignment over tailgate latches 442, and then dropping simulated pins 640 into those latches 442 until they are latched. See also FIG. 7 which shows simulated pin 640 captured in existing tailgate latch 442. FIG. 7 is taken along line 7-7 of FIG. 5A.

Thus, adjustable attachment of both the front top and bottom back of each bed extender sidewall 412 and 414 is possible when tailgate 422 is unlatched and pivoted down to horizontal by using original equipment latching pins 456 in original equipment latches 442. If either key hole shaped slot 656T or 656B can be used to attach bed extender 600 to original equipment latching pins 456 of that particular model and brand of truck, the sliding sleeves 638 can be moved to use the original equipment tailgate latches to latch down the back and bottom of bed extender 600.

As noted earlier, the remainder of bed extender 600 can take, as one example, the configuration of U.S. Pat. No. 6,746,066 bed extender 400. For example, as explained in U.S. Pat. No. 6,746,066, rear gate 420 can be attached to the back ends of bed extender sides 412 and 414 to complete the bed extender. Back gate 420 can be latched vertical per FIG. 1 or can be unlatched and pivoted down per FIG. 2A. When assembled to sides 412 and 414, it provides additional rigidity and stability of sides 412 and 414. However, other configurations from the sides and back gates of the bed extender are possible.

Therefore, as illustrated in the drawings and explained above, bed extender 600 provides a single system that can be mounted on a variety of vehicles including those that have different heights of original latching pins. This feature is built into the extender efficiently, flexibly, and economically. A single extender can be manufactured, distributed, and used for a variety of differently configured vehicles.

Again, because simulated pin 640 on slideable tube 638 latch into the existing original equipment latches on tailgate 422, the entire bed extender 600 is basically locked onto the pickup truck. Removal requires grabbing the tailgate unlatching lever and pulling it and then releasing simulated latching pins 640 from those existing tailgate latches 442. As can be further appreciated, some trucks allow locking of that tailgate latch release handle. In such circumstances, if locked, an installed bed extended 600 would also be at least substantially locked to the pickup truck. While the exemplary embodiment shown in the figures might allow rear gate 420 to be removed, at least the sides 412 and 414 would be locked in place.

Stabilizing Spacers at Gap Between Tailgate and Truck Bed

Third, an additional optional feature of bed extender 600 of FIGS. 2A and 2B can be seen at FIGS. 2B, and 10-12. Stabilizing spacer members 646 can be built-in along the front vertical pillars 428 of extender sides 412 and 414. Members 646 would function similarly to spacers 446 in U.S. Pat. No. 6,746,066 (see FIGS. 17, 23 and 24 of that patent). This downwardly extending member can help fix and stabilize bed extender 600 relative to the vehicle.

Stabilizing spacers 646 basically extend down and into or over original structure on the vehicle at or near the tailgate edge adjacent the gap between it and truck bed 418. By interference or wedging action, or by fitting around such existing structure at or near the pivot axis of tailgate 422, they can provide another set of points on bed extender 600 that deter movement of bed extender 600 in at least one direction relative to the vehicle. This can enhance the stability of the system.

The stabilizing spacers 646 of this bed extender 600 differ from spacers 446 of the 6,746,066 patent in at least the following ways. Spacer 446 of U.S. Pat. No. 6,746,066 is a single downwardly extending finger. In contrast, as illustrated in detail in the present drawings, e.g. FIGS. 5A-B, 8, 9 and 10-12, each stabilizing spacer 646 of bed extender 600 has two different downwardly extending members. One is essentially an elongated plate or finger 647. Near but spaced apart is another downwardly extending finger 650. In the embodiment shown in the figures, there is double-finger stabilizing spacer 646 on each opposite front lower side of bed extender 600. However, it is possible that only one spacer 646 could be used.

Figure 11:
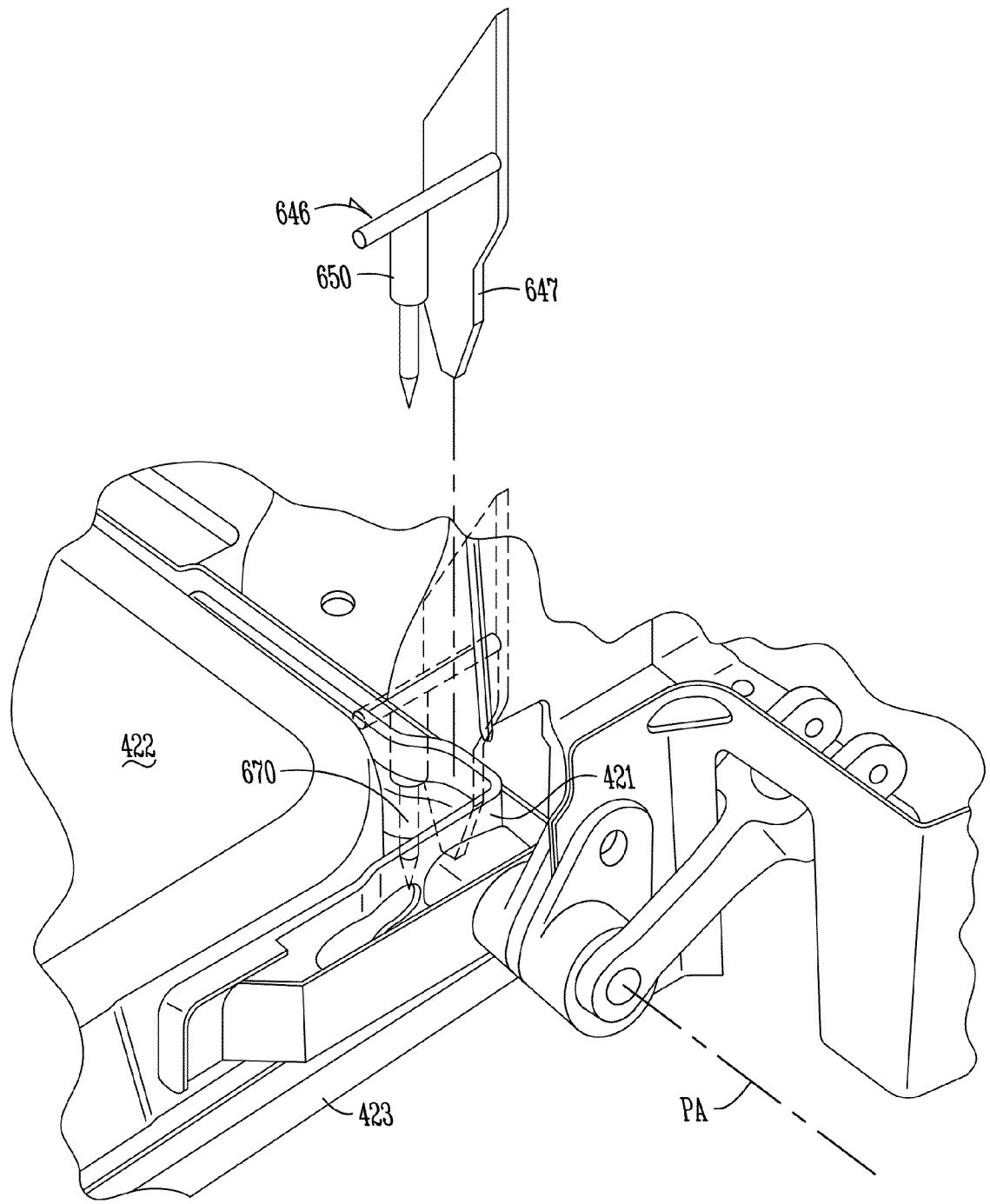
FIG. 11 is a partial perspective view further showing operation of the spacer stabilizer of FIG. 10 with a first brand or model of pickup truck.

As indicated in the figures, particularly FIG. 11, some models or brands of pickup tailgates 422 have a perimeter edge 423 that surrounds a thicker-in-cross-section central main tailgate portion 673. GMC/Chevy and Ram are examples. At that thinner perimeter edge 423 near opposite sides along the tailgate pivot axis PA are metal straps 421 that help strengthen that part of the tailgate and are mounting structures for the hinge or pivot components 672 for tailgate 422 to the truck body. Those straps 421 can have opposite ends fixed to tailgate 422 but also define relatively small open areas (see reference numbers 670 and 674 in FIGS. 11 and 12).

The distal end of finger 647 is shaped to fit into small open area 670 when side 412 or 414 of bed extender 600 is installed (see diagram of finger 647 above area 670 in solid lines and then lowered into area 670 in dashed lines in FIG. 11). Once fingers 647 are in position on both sides of tailgate 422, the metal straps 421 deters lateral movement of fingers 647. While each finger 647 can be withdrawn back out vertically, the metal strap 421 or other structure on the tailgate is a mechanical stop against lateral or horizontal movement. This helps stabilize the whole bed extender 600. This is another way in which bed extender 600 takes advantage of original equipment structure of a vehicle to help mount and stabilize bed extender 600 on the vehicle. This finger 647 works in a similar way to finger 446 of U.S. Pat. No. 6,746,066. See also FIGS. 9 and 10. As can be seen in FIG. 11, downwardly extending finger 647 fits into open area 670 to prevent horizontal movement of the lower front of bed extender 600. Such additional mounting to the pickup truck can help prevent bucking of bed extender 600 when, for example, the truck experiences bumps or forces that try to move the bed extender 600 relative the truck. Stabilizing spacer fingers 647 as shown tend to work for brands such as GMC/Chevy pickup trucks and Ford pickup trucks.

Figure 12:
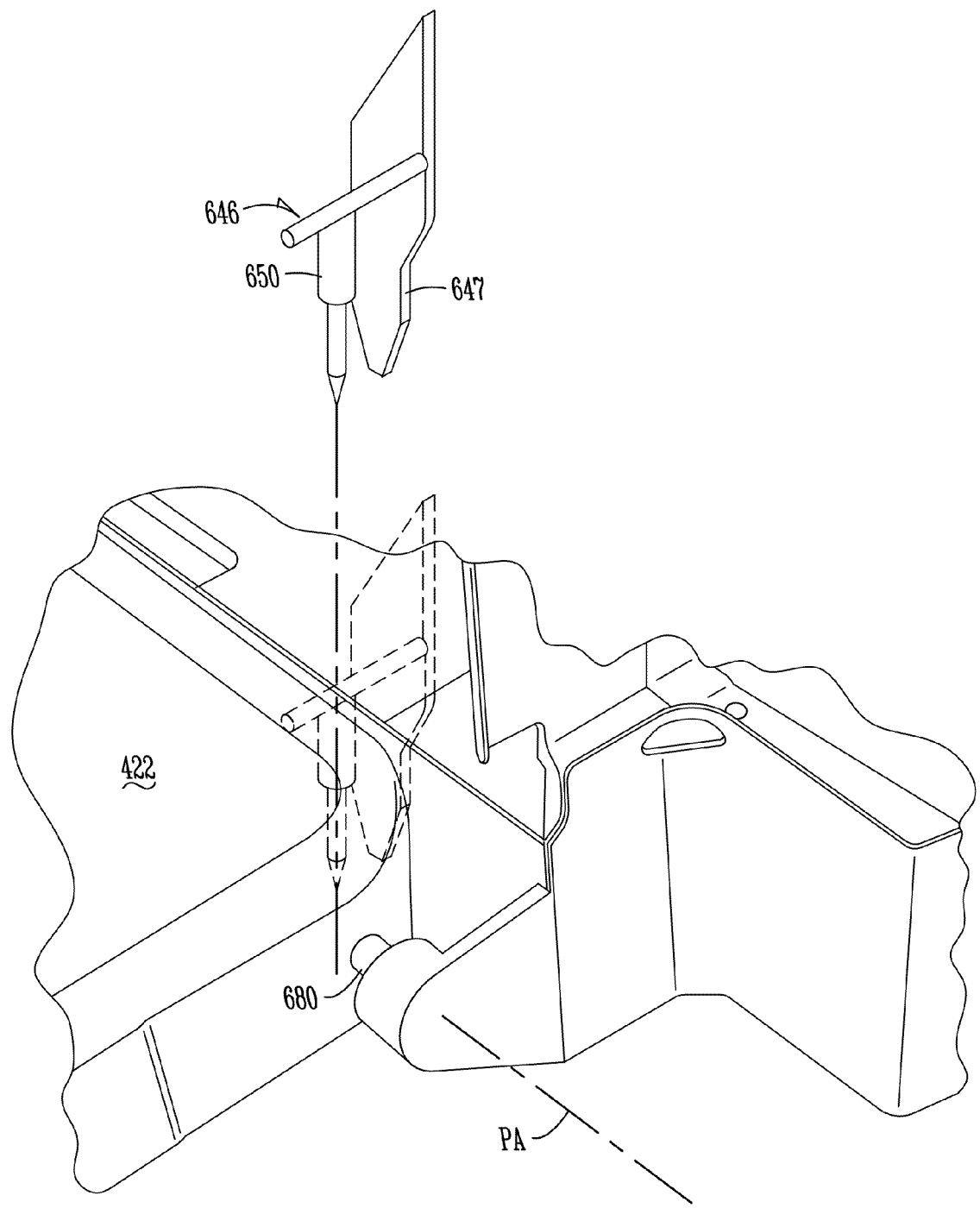
FIG. 12 is a partial perspective view further showing operation of the spacer stabilizer of FIG. 10 with a second brand or model of pickup truck.

But stabilizing spacers 646 of bed extender 600 have an additional finger or extension 650 (in addition to finger 647). As indicated in the figures, particularly FIG. 12, finger 650 is a different configuration than finger 647. It basically has a base cylindrical part and then a smaller distal end that tapers from the base part. As shown in FIG. 12, it can extend down into an open space 674 such as exists in different brand pickups between a strap 671 and a thicker part 673 of the tailgate. In FIG. 12 this particular configuration of stabilizing spacer end 650 is configured to work for Dodge Ram pickups. Note in FIGS. 11 and 12 that the other arm simply extends down into open space and is not used when the other arm is used.

As can be understood, stabilizing spacers 647 and 650 can take on different configurations. The illustrated embodiments are intended to work for the above mentioned brands or models. It is possible that different configured downwardly extending members could interact with other structures on a pickup truck for analogous purposes. As can be further understood, some pickups may not have the added structural straps discussed above regarding finger 647 but may have a cylindrical (or at least partially cylindrical or rod-shaped) structure (e.g. see ref. no. 672 FIG. 11) on opposite sides of the tailgate and at, near, or along the tailgate pivot axis PA. A different spacer 646 could have a downwardly extending inverted Y-shape distal end. Y-shaped end could be configured and positioned on bed extender 600 to have its inverted Y-shape fit over such cylindrical structure 672. Once in position, arms 650 would deter fore and aft movement of bed extender 600 at or near pivot axis PA of the tailgate. This could also assist or supplement stabilizing the entire bed extender 600 along the front and lower edge of bed extender. This assistance or supplemental stabilizing is at different positions than the other attachment points of bed extender at original equipment latching pins 456 and tailgate latches 442.

Thus, stabilizing spacers 646 of bed extender 600 have at least two different options for lower front stabilization—fingers 647 or Y-shaped arms 650. This is another way in which bed extender 600 would fit to different vehicle configurations or brands.

As can be appreciated, either fingers 647 or arms 650 could take on different configurations including for other vehicle structures. An important feature of these multiple piece stabilizing spacers (referred to generally at reference numbers 646) is that they work with a variety of differently configured vehicles. For example, flat fingers 647 tend to work with one configuration of pickup. Fingers 650 tend to work with another. This furthers an object of the invention to have one bed extender that can fit a variety of different model or brand vehicles. On the other hand, use of these spacers 646 is optional. Also, one or the other of fingers 647 or arms 650 could be used. Furthermore, a third or more additional and different extension could be added to spacers 646.

FIG. 2B shows how each side 412 and 414 of bed extender 600 takes advantage of front vertical pillars 428 to support a flange 658 with the double key hole slots 656T and 656B. Parallel but spaced apart flange 659 would prevent latching pins 456 from moving substantially laterally. Also horizontal bottom rails 426, rigidly connected to vertical pillars 428, carry the sliding simulated latching pins 637. That L shaped rigid arrangement provides structural rigidity between the front and back of bed extender 600. The remainder of each side 412 or 414 includes a top rail 431 which bends at 430 to vertical back rail top 432 which connects at bottom 433 to the back of bottom rail 426. Plural vertically-spaced inner cross beams (see FIG. 2B) extend between front pillar 428 and rear rail 432/433.

Importantly, once one of the two key hole slots is selected by the user for mounting of that side to the original equipment latching pin, the specific slot would be selected ideally such that lower rail 426 would temporarily sit in abutment on top of tailgate 422 to support each side 412 and 414. Then, the user could simply slide simulated latching pin slider 637 along lower rail 426 until aligned with original equipment latch on tailgate 422. Each side 412 and 414 would be lifted slightly up until simulated pins of sliders 637 are aligned above original equipment latches 442 on opposite sides of tailgate 422. Then, by appropriate downward pressure on rail 426 of each side 412 and 414, the simulated latching pins 640 of each slider 637 (which extend below the lowest plane of rails 426), would be pushed into and latch to original equipment latches 442. At the same time, one of the stabilizing spacers 646 would automatically move down towards the gap between tailgate 422 and truck bed 418. If the particular truck brand has an area 670 like FIG. 11, finger 649 would fit there and stabilize bed extender 600 there. If the particular truck brand has a cylindrical structure like 680 of FIG. 12, Y-shaped arm 651 would fit over it and stabilize bed extender 600 there.

It can therefore be seen that the apparatus described above provides substantial robust connection and stability between bed extender 600 sidewalls 412 or 414 and the truck.

Operation

As explained above, normal operation of bed extender 600 would be to take the major three pieces 412, 441, and 420 from storage. Each extender sidewall 412 and 414 would be sequentially first secured on original equipment latching pin 456 for the height of that pin relative to truck bed 418 and tailgate 422 in its down position. Slider pins 637 would then be slid along the lower rails 424 of each side member 412 and 414 to line up with original equipment latches 442 on tailgate 422. Downward pressure on each sidewall 412 and 414 would latch those simulated pins to the original equipment latches. If included on bed extender 600, stability spacers 647 would automatically fit into or over the associated complementary structure at or near the gap between tailgate 422 and truck bed 418. Finally, rear gate 420 would be operatively attached across the backs of sidewalls 412 and 414 to complete the installed bed extender 600 of FIG. 1.

As can be appreciated, bed extender 600 can be relatively easily and efficiently installed, removed, and used with a variety of different vehicles using existing mounting structures on and without modifying the vehicle. As could be further appreciated, the sides and back rails of bed extender 600 could be integrated and not separable if desired.

Options and Alternatives

It is to be appreciated that the foregoing example is but one form the invention can take. Variations obvious to those skilled in the art will be included within the invention.

For example, the hinging feature of rear gate 420 is not necessarily required. Also, the extender could be used without the stability spacers 646.

Various materials and configurations for the extender major pieces are possible. In the figures, tubular metal framework is utilized. Instead, full or partially complete panels or plates could be used. Mesh instead of crossbars could also be used or in additional to the crossbars shown.

Alternative ways to adjust the simulated latching pins are possible. Instead of a full tubular sleeve, a partial sleeve might be used. Alternatively, slots along the lower rails could allow longitudinal adjustment of the simulated latching pins.

Furthermore, more than two key hole slots would be used, as could one long slot. Other types of latch pin receivers are possible.

FIG. 2A shows an optional feature. Either by using one of the tubular rungs of back gate 420 when it is pivoted down as in FIG. 2A, or by adding a plate or structure 602 (or simply a non-slip surface on back gate 420, it can be used as a step to step up into the bed of the pickup truck.

It will be appreciated that further alternatives and options are possible.

What is claimed is:

1. A truck bed extender mountable to any of a plurality of pickup truck bodies with lowerable tailgates having a range of different spacings of tailgate latching pins on opposite inside vertical walls of the truck body and tailgate latches on opposite lateral sides of the tailgate from a pivot axis of the tailgate on the truck body, the truck bed extender comprising:

a. left and right generally vertical extender sides each having bottoms and fronts;

b. pin receivers at or near the fronts of the left and right extender sides to receive the tailgate latching pins over the range of different spacings from the tailgate pivot axis; and c. simulated tailgate latching pins mounted at or near and adjustable along the bottoms of the left and right extender sides and latchable into the tailgate latches on the tailgate over the range of different spacings from the tailgate pivot axis when the tailgate latching pins are in the pin receivers, the simulated tailgate latching pins each extend from a movable member which is adjustable along and at or near a corresponding bottom of a said vertical extender side, the simulated tailgate latching pin being of a configuration the same or similar to the tailgate latching pins on the truck body so that they may be captured in the tailgate latches on the tailgate and resist movement in any direction relative to the tailgate latch, the bottom of each extender side comprises a rigid elongated member and the movable member with the simulated tailgate latching pin comprises a tubular sleeve that slides along the rigid elongated member.

2. The truck bed extender of claim 1 wherein the tailgate latching pins each have a head of a first diameter and a stem of smaller diameter and each pin receiver comprises plural aligned keyhole shaped slots in series along the fronts of each extender side, each keyhole shaped slot including a first portion having a diameter larger than the head of the tailgate latching pin and a second elongated portion having a diameter smaller than the head of but larger than the stem of the tailgate latching pin, to allow the tailgate latching pin head and stem to be inserted through the first portion of the key-hole shaped slot and then the stem moved into the second elongated portion of the key hole shaped slot to resist movement of the latching pin in any direction except along the second elongated portion of the key-hole shaped slot.

3. The truck extender of claim 2 wherein the first portion of each of the key hole shaped slots is nearer the bottom edge of the extender side and the second portions extend towards the top edge of the extender side.

4. The truck bed extender of claim 1 wherein the truck bed extender further comprises a back cross member connectable between the left and right generally vertical extender sides.

5. The truck bed extender of claim 4 wherein the back cross member is pivotally connected to the left and right generally vertical extender sides at or near their bottoms to allow the back cross member to hinge down.

6. The truck bed extender of claim 5 further comprising a step connected to the back cross member to provide a step assist up to the truck body bed when the back cross member is hinged down.

7. The truck bed extender of claim 1 wherein a gap exists between the tailgate and the truck body when the tailgate is unlatched and lowered and the truck bed extender further comprises a stabilizing spacer member extending from at or near the fronts and bottoms of at least one of the left and right generally vertical extender walls and towards an area surrounded by a wall or a cylindrical structure on the tailgate at or near the gap when the truck bed extender is in mounted position on a truck.

8. The truck bed extender of claim 7 wherein the stabilizing spacer member comprises two extensions of different configurations, each different configuration adapted for different trucks, either extension helping to resist movement of a corresponding said left or right generally vertical extender side in at least one direction relative to the truck.

9. A truck bed extender mountable on different trucks having sidewalls on opposite sides of a truck bed, a tailgate pivotable at a lower edge along a pivot axis across the rear of the truck bed from a closed or latched position, tailgate latching pins extending towards one another from the truck sidewalls along an axis spaced at different distances from the pivot axis of the tailgate, and latches to receive and latch to the tailgate latching pins on opposite sides of the tailgate essentially the same distance from the tailgate pivot axis as the tailgate pivot pins, the truck bed extender comprising:

a. first and second opposite sides each having fronts, backs, tops and bottoms;

b. a rear side configured to span the backs of the first and second opposite sides;

c. pin receivers at or near the fronts of the first and second opposite sides to releaseably connect to the tailgate latching pins of different trucks spaced at different distances from the tailgate pivot axis and hold the fronts of the sides of the truck bed extender against at least fore, aft, and lateral movement relative to the truck;

d. pins at or near the bottoms of the first and second opposite sides to releaseably connect to the tailgate latches of different trucks spaced at different distances from the tailgate pivot axis and to hold the backs of the sides of truck bed extender against movement in any direction relative to the tailgate latches when the pins are latched to the tailgate latches, the pins at the bottoms of the first and second opposite sides are slideable over a range of distance for different tailgate latch positions on the tailgate, wherein each pin is on a tubular sleeve that slides along one of the first and second opposite sides;

e. so that the truck bed extender can be mounted to trucks having a range of different spacings between tailgate pivot axis and tailgate latching pins and latches.

10. The truck bed extender of claim 9 wherein the fronts of the first and second sides of the truck bed extender comprise vertical pillars with longitudinal axes and a plurality of keyhole slots at different distances from the tailgate pivot axis near or along the vertical pillars.

11. The truck bed extender of claim 10 wherein the tailgate latching pins have a head of larger diameter at the end of a smaller diameter stem and the keyhole slots of the truck bed extender have a first larger opening sized to receive therethrough the head of the latching pin and a slot smaller than the diameter of the head but slideably receiving the stems.

12. The truck bed extender of claim 9 wherein there is a gap between the tailgate and the truck bed and original equipment supporting structure on or near the tailgate at or near the gap and further comprising a stabilizer spacer at or near at least one of the first and second opposite sides positioned and extending towards the supporting structure on or near the tailgate near the gap between the tailgate and the truck bed when the tailgate is lowered and the truck bed extender is mounted, the stabilizer spacer comprising first and second extensions configured for said supporting structure for different makes of trucks.

13. A truck bed extender for a truck having a truck bed, opposite truck bed sidewalls, and a rear downward hinging tailgate having opposite sides that generally align with the opposite truck bed sidewall and a tailgate hinge generally aligned with the truck bed, where the tailgate includes along each opposite side an original equipment latch which receives and latches to an original equipment pin spaced above the truck bed and extending inwardly from each opposite truck bed sidewall when the tailgate is hinged up against the truck bed sidewalls, comprising:
  a. first and second truck bed extender sidewalls each having a front, back, top, bottom, and opposite sides;
  b. a truck bed extender rear wall configured to span between the first and second truck bed extender sidewalls;
  c. plural pin receivers at the front of each truck bed extender sidewall each adapted to receive and capture a said original equipment pin on the truck bed sidewall and hold the truck bed extender sidewall at least against fore, aft, and lateral movement relative the truck bed;
  d. an adjustable pin at the bottom of each truck bed extender sidewall each adapted to simulate a truck bed sidewall pin and latch into a said original equipment latch on the tailgate, wherein the pin receivers comprise tail-gate pin capturing slots and the adjustable pin comprises a slideable tubular member and pin that slides along the bottom of the sidewall.

14. The truck bed extender of claim 13 in combination with a truck.

15. The combination of claim 14 wherein the truck can be of at least two different brands and comprises one of:
  a. a two-door standard cab pickup truck;
  b. a two-door extended cab pickup truck; or
  c. a four-door extended cab pickup truck.

16. A method of allowing mounting of a pickup truck bed extension to original equipment tailgate latching pins and original equipment tailgate latches at different distances from a tailgate pivot axis comprising:
  a. mounting the pickup truck bed extension to said original equipment latching pins;
  b. adjusting position of said simulated latching pins on the truck bed extension to align with and latch to said original equipment tailgate latches, wherein adjusting position of the simulated latching pins comprises sliding the simulated pins along the truck bed extension each on a tubular sleeve.

17. The method of claim 16 further comprising providing plural mounting locations on the truck bed extension for the original equipment latching pins.

18. The method of claim 16 further comprising stabilizing the truck bed extension by extending a spacer member between the tailgate and the truck bed.

\* \* \* \* \*